US008661799B2

(12) United States Patent
Yacoub

(10) Patent No.: US 8,661,799 B2
(45) Date of Patent: Mar. 4, 2014

(54) EXHAUST SYSTEM FOR AN INTERNAL COMBUSTION ENGINE

(75) Inventor: Yasser Mohamed sayed Yacoub, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 144 days.

(21) Appl. No.: 13/267,768

(22) Filed: Oct. 6, 2011

(65) Prior Publication Data
US 2012/0090295 A1 Apr. 19, 2012

(30) Foreign Application Priority Data

Oct. 13, 2010 (DE) .................. 10 2010 038 138
Oct. 13, 2010 (DE) .................. 20 2010 008 788 U

(51) Int. Cl.
*F01N 5/02* (2006.01)
(52) U.S. Cl.
USPC .............. 60/320; 60/292; 60/289; 165/42
(58) Field of Classification Search
USPC .................................... 60/374–324
See application file for complete search history.

(56) References Cited

U.S. PATENT DOCUMENTS

| | | | | |
|---|---|---|---|---|
| 2,076,287 A | * | 4/1937 | Arnold | 237/12.3 B |
| 2,529,915 A | * | 11/1950 | Chausson | 237/12.3 A |
| 5,133,298 A | * | 7/1992 | Ahnger | 122/7 R |
| 6,141,961 A | * | 11/2000 | Rinckel | 60/288 |
| 6,155,212 A | * | 12/2000 | McAlister | 123/3 |
| 6,330,910 B1 | * | 12/2001 | Bennett | 165/297 |
| 6,568,179 B2 | * | 5/2003 | Deeba | 60/298 |
| 6,871,489 B2 | * | 3/2005 | Tumati et al. | 60/285 |
| 7,171,800 B2 | * | 2/2007 | Shih et al. | 60/288 |
| 7,246,487 B2 | * | 7/2007 | Hara | 60/298 |
| 7,426,825 B2 | * | 9/2008 | Viola et al. | 60/286 |
| 7,527,126 B2 | * | 5/2009 | Kuroda et al. | 181/254 |
| 7,921,647 B2 | * | 4/2011 | Grunditz et al. | 60/605.2 |
| 8,333,066 B2 | * | 12/2012 | Hirose | 60/300 |
| 2007/0272480 A1 | | 11/2007 | Kuroda et al. | |
| 2011/0072808 A1 | * | 3/2011 | Steurer et al. | 60/311 |

FOREIGN PATENT DOCUMENTS

| | | |
|---|---|---|
| DE | 10346345 A1 | 4/2005 |
| DE | 102008007784 A1 | 8/2008 |
| EP | 1122413 A2 | 8/2001 |

* cited by examiner

*Primary Examiner* — Jesse Bogue
(74) *Attorney, Agent, or Firm* — Julia Voutyras; Alleman Hall McCoy Russell & Tuttle LLP

(57) ABSTRACT

An exhaust system for an internal combustion engine is provided. The engine comprises an exhaust line, at least one exhaust gas aftertreatment device arranged in the exhaust line, and a heat source and a heat sink arranged in separate branches of the exhaust line upstream of the exhaust gas aftertreatment device, an exhaust gas flow rate through each respective separate exhaust branch controlled by at least one flow control device. In this way, the temperature of the exhaust entering the aftertreatment device may be controlled by an amount of exhaust that flows through each branch of the exhaust line.

17 Claims, 3 Drawing Sheets

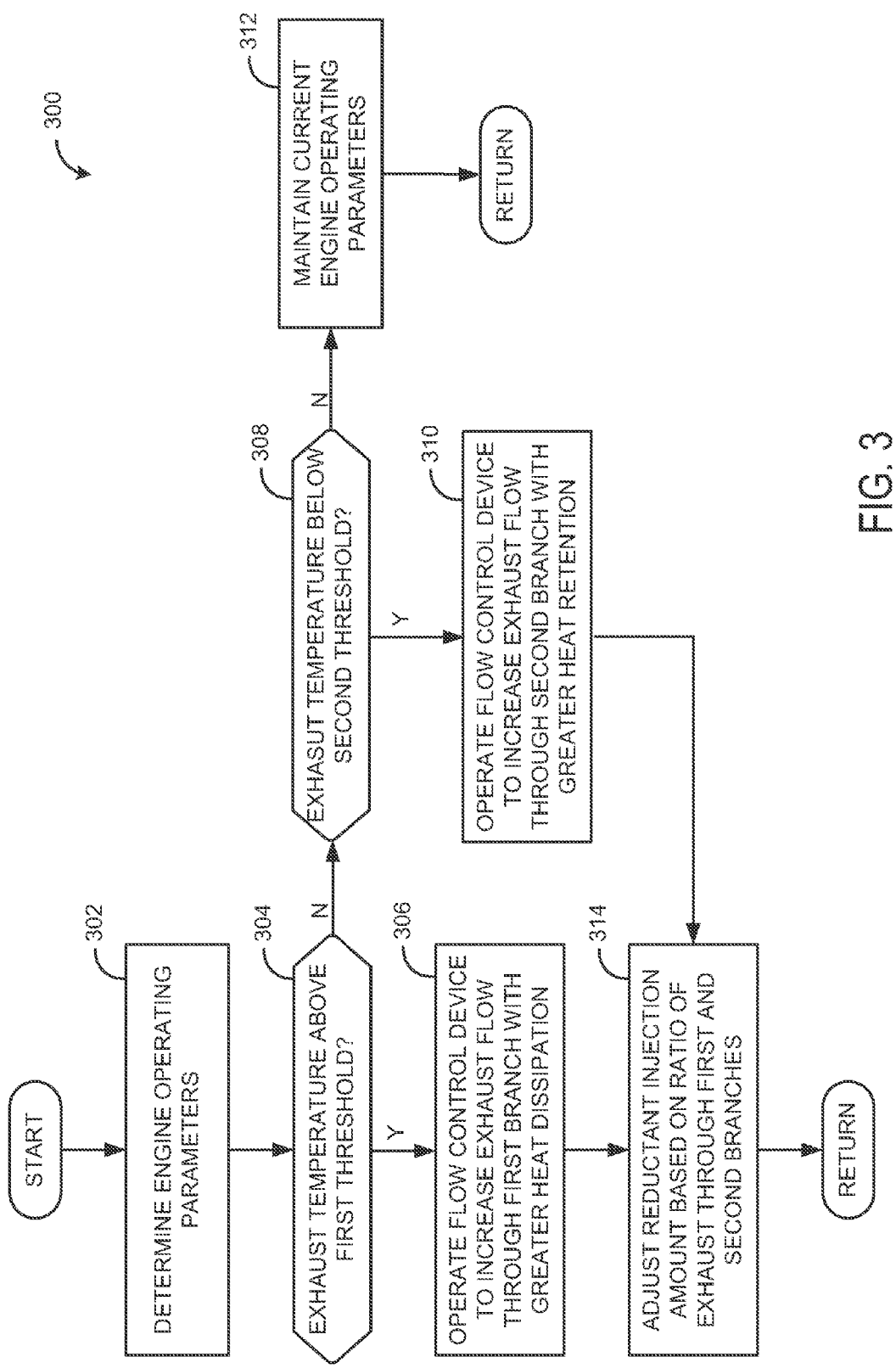

EXHAUST SYSTEM FOR AN INTERNAL COMBUSTION ENGINE

RELATED APPLICATIONS

The present application claims priority to German Patent Application No. 102010038138.1, filed on Oct. 13, 2010, and also to German Patent Application No. 202010008788.0, filed on Oct. 13, 2010, the entire contents of each of which are hereby incorporated by reference.

FIELD

The present disclosure relates to an exhaust system for an internal combustion engine.

BACKGROUND AND SUMMARY

Treating the exhaust gases from an internal combustion engine, e.g. a spark-ignition or diesel engine, by an exhaust gas aftertreatment device arranged in the exhaust tract in order to reduce pollutant emissions is a widely known practice. In this case, the efficiency or effectiveness of the exhaust gas aftertreatment device is affected by the temperature level prevailing in the exhaust gas aftertreatment device and by the fuel/air ratio used in combustion in the internal combustion engine.

Transient engine operating conditions, such as operator-induced sudden demand for torque, can result in temperature fluctuations that affect operation of downstream exhaust aftertreatment devices. For example, a selective catalyst reduction (SCR) system and a lean NOx trap (LNT) may release ammonia and NOx, respectively, when engine exhaust temperature exceeds a threshold temperature for a short period of time. Release of such compounds may negatively affect the quality of the environment, and may reduce the catalytic efficiency of the aftertreatment device.

The inventors herein recognize the above issues and have provided an exhaust system to at least partly address the issues. In one example embodiment, an exhaust system for an internal combustion engine comprises an exhaust line, at least one exhaust gas aftertreatment device arranged in the exhaust line, and a heat source and a heat sink arranged in separate branches of the exhaust line upstream of the exhaust gas aftertreatment device. An exhaust gas flow rate through each respective separate exhaust branch may be controlled by at least one flow control device.

In this way, the exhaust system for an internal combustion engine may exhibit a considerably reduced ammonia and/or nitrogen oxide slip or essentially no slip at all in an SCR catalytic converter or a NOx storage catalytic converter during non-steady-state operation of the internal combustion engine, e.g. in the event of an abrupt change in the exhaust gas temperature owing to a jump in the load on the internal combustion engine, and thus allows optimum and effective operation of the exhaust system and/or of the exhaust gas aftertreatment device in terms of exhaust gas cleaning or conversion performance.

It should be pointed out that the features presented individually in the claims can be combined in any technically sensible manner and give rise to further embodiments of the disclosure. The description further characterizes and specifies the disclosure, especially in conjunction with the figures.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a flow chart illustrating a method for controlling exhaust temperature in an emissions control system.

DETAILED DESCRIPTION

Figure 1:
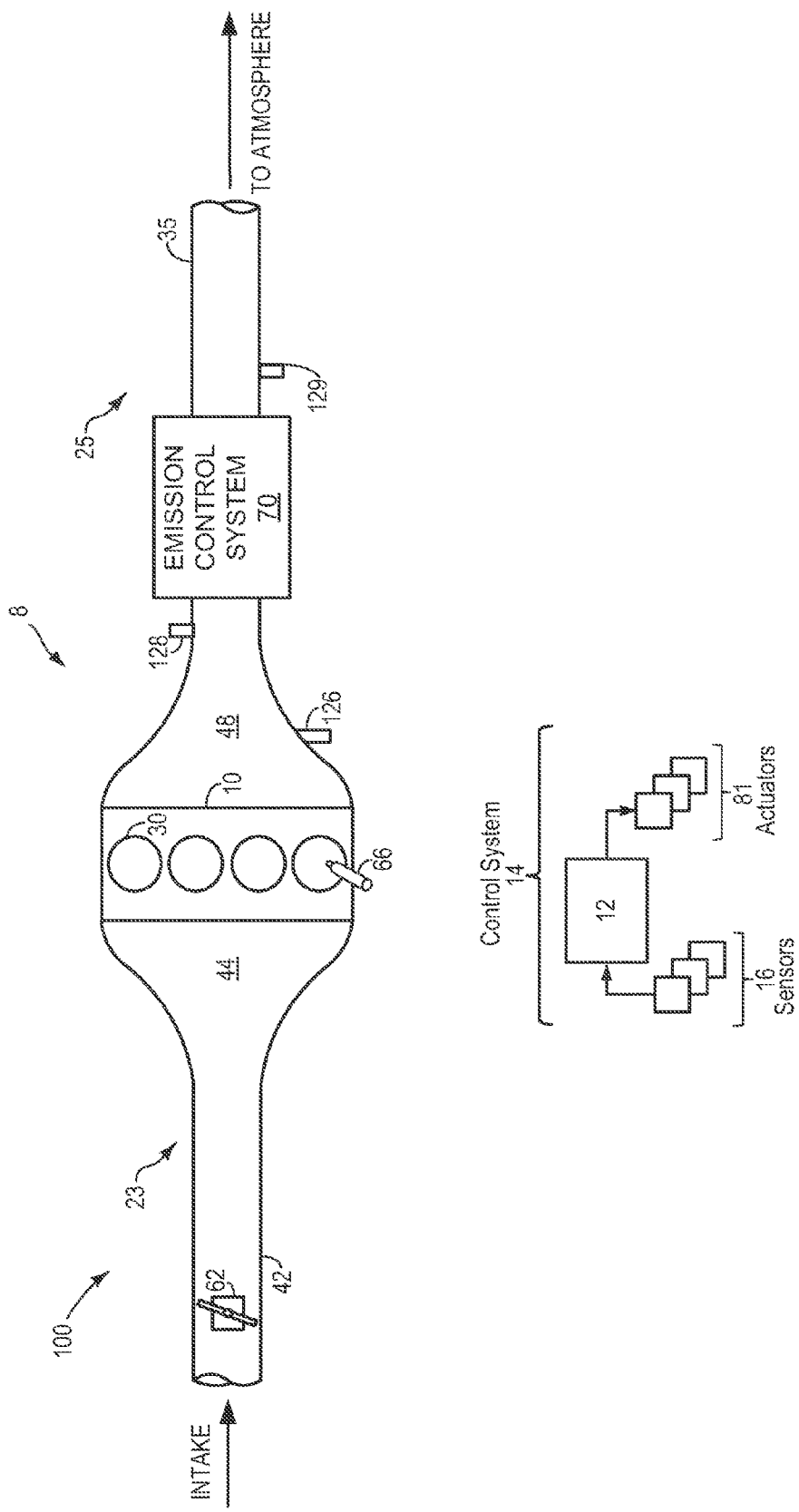
FIG. 1 schematically shows a non-limiting example of a vehicle system including an emissions control device according to an embodiment of the present disclosure.
Figure 2:
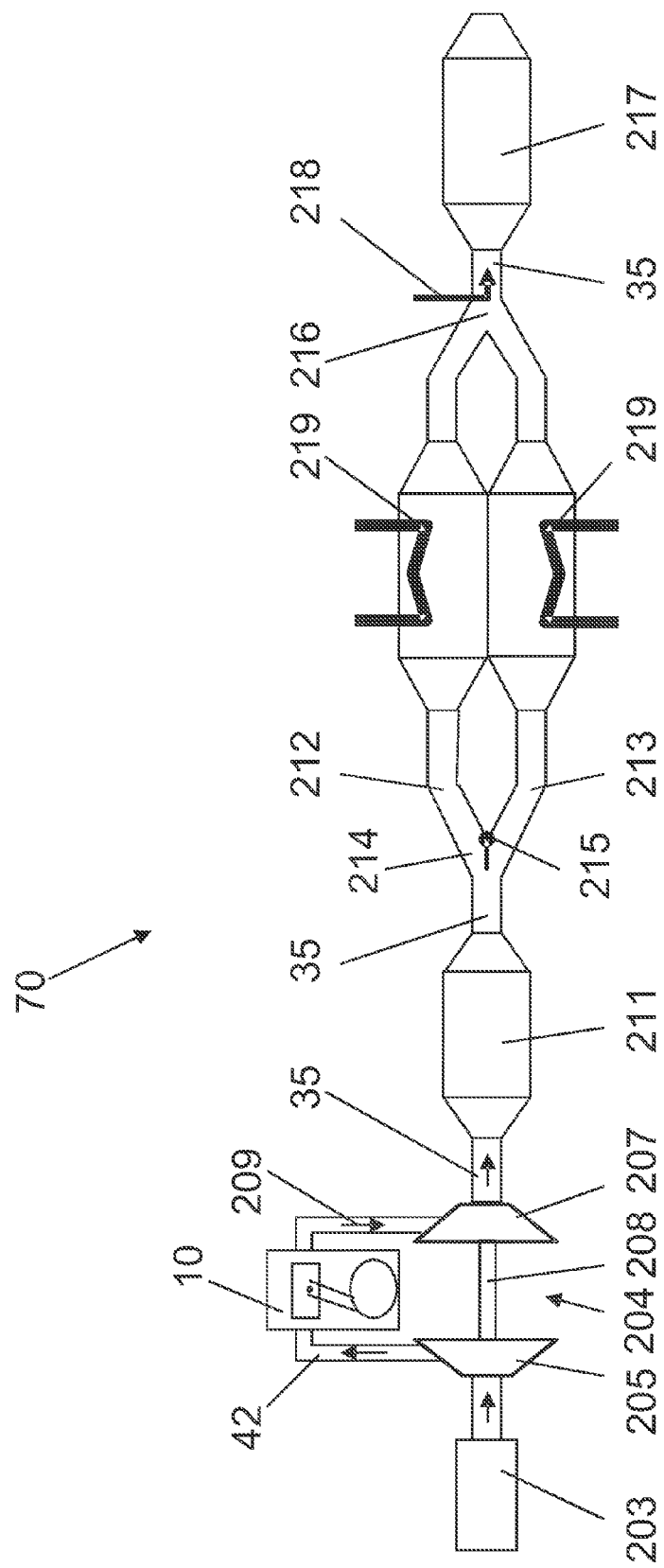
FIG. 2 shows a schematic depiction of an illustrative embodiment of an exhaust emissions control system according to the disclosure for the internal combustion engine of FIG. 1.

Rapid changes in exhaust temperature can lead to efficiency decreases in the performance of exhaust aftertreatment devices coupled to an engine. By controlling exhaust flow through different branches of an exhaust line, each of which are configured to either release or retain heat, the temperature of the exhaust may be controlled. FIGS. 1 and 2 depict an emissions control system coupled to an engine and FIG. 3 is an example method of operating an emissions control system to control exhaust temperature.

FIG. 1 shows a schematic depiction of a vehicle system 6. The vehicle system 6 includes an engine 10 having a plurality of cylinders 30. The engine 10 includes an intake 23 and an exhaust 25. The intake 23 includes a throttle 62 fluidly coupled to the engine intake manifold 44 via an intake passage 42. The exhaust 25 includes an exhaust manifold 48 leading to an exhaust passage 35 that routes exhaust gas to the atmosphere. The exhaust 25 may include an emissions control system 70 including one or more emission control devices, which may be mounted in a close-coupled position in the exhaust. One or more emission control devices may include a three-way catalyst, lean NOx trap, diesel particulate filter, oxidation catalyst, etc. The emission control system 70 will be discussed in further detail below with respect to FIG. 2. It can be appreciated that other components may be included in the engine such as a variety of valves and sensors.

Engine 10 may receive fuel from a fuel system (not shown) including a fuel tank and one or more pumps for pressurizing fuel delivered to the injectors 66 of engine 10. While only a single injector 66 is shown, additional injectors are provided for each cylinder. It can be appreciated that the fuel system may be a returnless fuel system, a return fuel system, or various other types of fuel system. The fuel tank may hold a plurality of fuel blends, including fuel with a range of alcohol concentrations, such as various gasoline-ethanol blends, including E10, E85, gasoline, etc., and combinations thereof.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include temperature sensor 126 and upstream and downstream exhaust gas sensor 128, 129 (such as a binary HEGO sensor and/or UEGO sensor). Other sensors such as pressure, temperature, and composition sensors may be coupled to various locations in the vehicle system 6, as discussed in more detail herein. The actuators may include fuel injector 66, throttle 62, and a flow control device (not pictured in FIG. 1).

The control system 14 may include a controller 12. The controller may receive input data from the various sensors, process the input data, and trigger the actuators in response to the processed input data based on instruction or code programmed therein corresponding to one or more routines. For example, the controller may hold instructions that are executable to carry out control routines, such the example control routine described herein with regard to FIG. 3.

In the case of spark-ignition engines, catalytic reactors may be used for emissions control, for example, said reactors employing catalytic materials which increase the rate of certain reactions to ensure oxidation of hydrocarbons (HC) and carbon monoxide (CO), even at low temperatures. If the intention is additionally to reduce nitrogen oxides (NOx), this can be achieved by using a three-way catalytic converter, although this requires stoichiometric operation ($\lambda \approx 1$) of the spark-ignition engine within narrow limits. In this case, the nitrogen oxides are reduced by the available unoxidized exhaust gas components, namely carbon monoxides and unburned hydrocarbons, while these exhaust gas components are oxidized at the same time.

In the case of internal combustion engines operated with an excess of air, that is to say, for example, spark-ignition engines which operate on a lean mixture and especially direct-injection diesel engines but also direct-injection spark-ignition engines, the nitrogen oxides in the exhaust gas cannot be reduced because of the principle involved, namely the lack of a reducing agent.

To oxidize the unburned hydrocarbons and carbon monoxide, an oxidation catalytic converter, in particular, is provided in the exhaust gas stream. In order to achieve adequate conversion, a certain operating temperature is required. The "light-off temperature" can be 120° C. to 250° C.

It is possible to reduce nitrogen oxide emissions from an internal combustion engine operated with an excess of air, especially a diesel engine, by using a reducing agent that contains ammonia on a selectively acting catalytic converter, referred to as an "SCR catalytic converter" (SCR: Selective Catalytic Reduction), to give nitrogen dioxide ($NO_2$) and water ($H_2O$). Gaseous ammonia ($NH_3$), an aqueous solution of ammonia or an aqueous solution of urea are used as reducing agents. If urea is used as the reducing agent, the urea is injected directly into the exhaust tract upstream of a hydrolysis catalytic converter and is converted into ammonia there by hydrolysis. The nitrogen oxides produced during combustion in the internal combustion engine are then reduced selectively to water and nitrogen by the ammonia temporarily stored in the SCR catalytic converter. In particular, the SCR catalytic converter can store ammonia at low temperatures until a certain storage capacity is reached, this ammonia being desorbed again at high temperatures.

Apart from ammonia and urea, unburned hydrocarbons are also used as a reducing agent. The latter is also referred to as HC enrichment, where the unburned hydrocarbons are introduced directly into the exhaust tract or are supplied by measures within the engine, namely through secondary injection of additional fuel into the combustion chamber after the actual combustion process. Here, the additional fuel injected is not supposed to be ignited in the combustion chamber by the ongoing main combustion process or by the combustion gas temperatures, which are still high after completion of the main combustion process, but is supposed to be introduced into the exhaust tract during the exhaust and refill process.

In principle, it is also possible for nitrogen oxide emissions to be reduced by what are referred to as nitrogen oxide or NOx storage catalytic converters (LNT: Lean NOx Trap). Here, the nitrogen oxides are initially adsorbed, i.e. collected and stored, in the catalytic converter during lean-burn operation of the internal combustion engine and are then reduced during a regeneration phase, e.g. by substoichiometric operation (e.g. $\lambda<0.95$) of the internal combustion engine in conditions of oxygen deficiency.

Further options within the engine for achieving rich-mixture, i.e. substoichiometric, operation of the internal combustion engine, are exhaust gas recirculation (EGR) and, in the case of diesel engines, throttling in the intake tract. It is possible to dispense with measures within the engine if the reducing agent is introduced directly into the exhaust tract, e.g. by injecting additional fuel. During the regeneration phase, the nitrogen oxides are released and are converted substantially into nitrogen dioxide ($NO_2$), carbon dioxide ($CO_2$) and water ($H_2O$). The frequency of the regeneration phases is determined by the total emissions of nitrogen oxides and the storage capacity of the NOx storage catalytic converter (LNT).

The temperature of the storage catalytic converter (LNT) should preferably be in a temperature window between 200° C. and 450° C., thus, on the one hand, ensuring rapid reduction of the nitrogen oxides and, on the other hand, ensuring that no desorption takes place without conversion of the nitrogen oxides that are released again, something that may be triggered by excessive temperatures.

One difficulty in the use and, especially, in the arrangement of the NOx storage catalytic converter in the exhaust tract arises from the sulfur contained in the exhaust gas, which is likewise adsorbed in the NOx storage catalytic converter and has to be removed at regular intervals as part of "desulfurization", i.e. removal of sulfur. For this purpose, the NOx storage catalytic converter may be heated to a high temperature, generally between 600° C. and 700° C., and be supplied with a reducing agent, it being possible to achieve this, in turn, by the transition to rich-mixture operation of the internal combustion engine. The higher the temperature of the NOx storage catalytic converter, the more effectively desulfurization proceeds, although a permitted maximum temperature should not be exceeded since, in that case, desulfurization of the NOx storage catalytic converter contributes markedly to the thermal aging of the catalytic converter owing to excessive temperatures. As a result, there is a negative effect on the desired conversion of the nitrogen oxides toward the end of the life of the NOx storage catalytic converter, and storage capacity, in particular, decreases owing to thermal aging.

To minimize emissions of soot particles, regenerative particulate filters may be used, which filter out and store the soot particles from the exhaust gas, these soot particles generally being burned intermittently at high temperatures of around approximately 550° C. as part of the regeneration of the filter. The regeneration intervals are determined inter alia by the exhaust gas back pressure due to the increasing flow resistance of the filter owing to the growing mass of particulates in the filter.

Since both the exhaust gases from spark-ignition engines and the exhaust gases from diesel engines contain unburned hydrocarbons, carbon monoxide, nitrogen oxides and soot particles, albeit in different amounts and with different characteristics, combined exhaust gas aftertreatment devices may comprise one or more of the catalytic converters and/or filters described above.

In the above-described methods for reducing nitrogen oxide emissions by SCR catalytic converters and/or NOx storage catalytic converters (LNT), there is generally the problem of uncontrolled (thermal) desorption of ammonia from the SCR catalytic converter (referred to as "ammonia slip") and nitrogen oxides from the NOx storage catalytic converter (referred to as "nitrogen oxide slip"). This thermal desorption occurs especially if there is a rapid and abrupt rise in temperature in the exhaust system, such as that which can occur after a jump in the load on the internal combustion engine owing to a sudden demand for power by a user (kickdown). As a result, there is an abrupt increase in untreated NOx emissions from the internal combustion engine, on the one hand, and in the exhaust gas temperature, on the other. At the same time, the adsorption capacity of the SCR catalytic converter and/or the NOx storage catalytic converter falls with the increase in the temperature of the exhaust gas and the rise in temperature propagating through the exhaust system and the respective catalytic converters.

Since the time constants of the SCR catalytic converter and NOx storage catalytic converter units are generally insufficiently large, more of the ammonia stored in the SCR catalytic converter is desorbed than would normally be consumed during the conversion of the nitrogen oxide emissions. The nitrogen oxides stored in a NOx storage catalytic converter are likewise desorbed if there is an excessively rapid rise in temperature, even if no regeneration phase is taking place, e.g. by means of substoichiometric operation of the internal combustion engine in conditions of oxygen deficiency or through additional injection of reducing agent, e.g. fuel, into the exhaust tract, as already described.

An abrupt rise in the exhaust gas temperature in the exhaust system can also occur, for example, at the beginning of a regeneration phase of a particulate filter or of desulfurization of a NOx storage catalytic converter, which are carried out at high temperatures, as already described as the outset. The catalytic converters and/or filters arranged in an exhaust gas aftertreatment device downstream of the particulate filter to be regenerated or of the NOx storage catalytic converter are particularly affected by such a rise in temperature.

The emissions control system 70 may control such abrupt changes in temperature in aftertreatment devices by regulating the temperature of the exhaust flowing through the devices. FIG. 2 illustrates an embodiment of the emissions control system 70 according to the disclosure for an internal combustion engine 10. In general terms, the internal combustion engine 10 draws in air via an air filter 203 for the combustion of a fuel/air mixture in a combustion chamber (not shown) of the internal combustion engine 10. In the case of the internal combustion engine 10 depicted in FIG. 2, the air is compressed with the aid of a turbocharger 204, in particular a compressor 205, in the exhaust passage 35 of the internal combustion engine 10. For this purpose, the turbocharger 204 is driven in a known manner, by way of a turbine 207 connected to the compressor 205 by a shaft 208, by the exhaust gas stream 209 leaving the internal combustion engine 10 after combustion.

In the illustrative embodiment shown, a first (optional) exhaust gas aftertreatment device 211 is arranged in the exhaust line 35 downstream of the turbine 207 of the turbocharger 204. The first exhaust gas aftertreatment device 211 can have at least one oxidation catalytic converter, particulate filter, SCR catalytic converter and/or NOx storage catalytic converter, in particular an LNT, or any combination thereof, for example. The first exhaust gas aftertreatment device 211 is used for an initial exhaust gas cleaning process.

Downstream of the first exhaust gas aftertreatment device 211, the exhaust line 35 of the illustrative embodiment depicted in FIG. 2 divides into two separate exhaust branches 212 and 213, it being possible for exhaust branch 212 to be operated as a heat sink and for exhaust branch 213 to be operated as a heat source. As can furthermore be seen from FIG. 2, a flow control device 215, e.g. a flow control flap or a changeover valve, is arranged in the exhaust line 35 in the region of the upstream branch point 214. In the illustrative embodiment described here, the flow control device 215 is designed in such a way that it can partially to completely close or open exhaust branch 212 or exhaust branch 213. Thus only one flow control device 215 is used, by which complete control of the exhaust gas flow through both exhaust branches 212, 213 is possible. The arrangement of a number of flow control devices 215, e.g. a flow control device 215 assigned to each separate exhaust branch 212, 213, is also possible.

Thus, depending on the position of the flow control device 215, the exhaust gas stream carried in the exhaust line 35 can either be passed completely via the exhaust branch 212 that can be operated as a heat sink, that is to say the flow control device 215 completely closes the exhaust branch 213 that can be operated as a heat source, or the exhaust gas stream can be passed completely via the exhaust branch 213 that can be operated as a heat source, that is to say the flow control device 215 completely closes the exhaust branch 212 that can be operated as a heat sink. In the illustrative embodiment depicted in FIG. 2, the exhaust gas stream can furthermore likewise be passed simultaneously via one exhaust branch 212 and via the other exhaust branch 213 by any desired intermediate position of the flow control device 215 between the abovementioned end positions. Thus particularly accurate and finely graduated control of the exhaust gas temperature after the downstream branch point 216, that is to say after the entry of both exhaust branches 212 and 213 into the exhaust line 35, is possible. In a simpler embodiment of an exhaust system according to the disclosure, however, it is also possible to use a flow control device which can completely close or open only one exhaust branch 212 or the other exhaust branch 213 and thus does not allow any intermediate positions.

A second exhaust gas aftertreatment device 217 is arranged in the exhaust line 35 downstream of the separate exhaust branches 212 and 213, that is to say after both exhaust branches 212 and 213 reenter the exhaust line 35 at the downstream branch point 216. This exhaust gas aftertreatment device 217 has at least one SCR catalytic converter and/or one NOx storage catalytic converter. In order to supply the SCR catalytic converter in the second exhaust gas aftertreatment device 217 with a reducing agent, e.g. an aqueous solution of ammonia or urea, a reducing agent injection device 218 for injecting the reducing agent into the exhaust line 35 is provided upstream of the second exhaust gas aftertreatment device 217.

The flow control device 215, in particular the position of the flow control device 215, is preferably controlled by a control device (not shown in FIG. 2), such as controller 12. The input parameters used to determine the optimum position of the flow control device 215 are, in particular, the exhaust gas temperature of the internal combustion engine 10 and/or the exhaust gas mass flow and/or the ratio of the ammonia stored in an SCR catalytic converter arranged downstream of exhaust branches 212 and 213 to the ammonia storage capacity of the SCR catalytic converter and/or the ratio of the nitrogen oxides stored in an NOx storage catalytic converter arranged downstream of exhaust branches 212 and 213 to the nitrogen oxide storage capacity of the NOx storage catalytic converter and any desired combination thereof.

The abovementioned parameters can be measured in a known manner by suitable sensors or, can also be calculated from already available measured values for other operating parameters of the emissions control system 70 and/or the internal combustion engine 10. Control or positioning of the flow control device 215 which is optimally matched to the current operating condition of the emissions control system 70 is thus ensured at all times. For this purpose, the flow control device 215 can be either electrically or mechanically controlled.

If the exhaust gas temperature of the internal combustion engine 10 rises abruptly, e.g. in the case of a jump in the load on the internal combustion engine 10, of the kind which occurs when there is a sudden demand for power by a user for example, the exhaust gas stream will be directed at least partially or completely through the exhaust branch 212 that can be operated as a heat sink by the flow control device 215 after passing through the first exhaust gas aftertreatment device 211, in which the exhaust gases undergo an initial cleaning or conversion process by means of an oxidation catalytic converter and/or a particulate filter for example. In exhaust branch 212, heat may be removed from the exhaust gas and released to the environment via cooling ribs (not shown in FIG. 2) arranged on exhaust branch 212, for example. Instead of the cooling ribs or in addition to the latter, a heat exchanger 219 (merely indicated in FIG. 2), by which the heat removed from exhaust branch 212 can be transferred to the exhaust branch 213 that can be operated as a heat source and is then available for heating the exhaust gases flowing through exhaust branch 213, can be arranged on exhaust branch 212.

Passing the exhaust gases through exhaust branch 212 has the effect that the abrupt rise in the exhaust gas temperature at the upstream branch point 214 does not propagate or at least propagates with a considerable delay and with a significantly attenuated magnitude and furthermore within a significantly longer period of time to the downstream branch point 216, thereby enabling the exhaust gas temperature at the inlet of the second exhaust gas aftertreatment device 217, in particular at the inlet of the SCR catalytic converter and/or NOx storage catalytic converter included therein, to be controlled in a specifically intended manner. Uncontrolled thermal desorption of the ammonia stored in the SCR catalytic converter or ammonia slip is thereby avoided, and the ammonia required for the normal conversion of the nitrogen oxide emissions is consumed. Nitrogen oxide slip due to uncontrolled thermal desorption of the nitrogen oxides stored in a NOx storage catalytic converter of the exhaust gas aftertreatment device 217 is likewise prevented. Furthermore, the lower inlet temperature at the exhaust gas aftertreatment device 217 or NOx storage catalytic converter considerably increases the nitrogen oxide storage capacity thereof, thus enabling the regeneration phases for the NOx storage catalytic converter to be carried out at a longer time interval.

If the exhaust gas temperature of the internal combustion engine 10 falls, e.g. after a reversal of the demand for power from the internal combustion engine 10, the exhaust gas stream is, after passing through the first exhaust gas aftertreatment device 211, directed at least partially or completely through the exhaust branch 213 that can be operated as a heat source by means of the flow control device 215. In exhaust branch 213, heat is supplied to the exhaust gas, for example, e.g. via the heat exchanger 219. For this purpose, the heat exchanger 219 can be arranged between the exhaust branch 212 that can be operated as a heat sink and exhaust branch 213, with the result that it absorbs the heat given off by exhaust branch 212 and transfers it to exhaust branch 213. Instead of or in addition to the heat exchanger 219, exhaust branch 213 can be provided with thermal insulation (not shown in FIG. 2).

Passing the exhaust gases through the exhaust branch 213 that can be operated as a heat source has the effect that the exhaust gas temperature level between the upstream branch point 214 and the downstream branch point 216 can be essentially maintained or raised, despite the falling exhaust gas temperature of the internal combustion engine 10, as a result of which the exhaust gas temperature at the inlet of the second exhaust gas aftertreatment device 217, in particular at the inlet of the SCR catalytic converter and/or NOx storage catalytic converter included therein, can be controlled in a specifically intended manner. With the exhaust system according to the disclosure, it is thus possible to ensure the optimum temperature window at all times for the operation of the SCR catalytic converter or NOx storage catalytic converter, in particular irrespective of the instantaneous operating condition of the internal combustion engine 10 and hence also during non-steady-state operation of the internal combustion engine 10.

The exhaust system according to the disclosure is not limited to the illustrative embodiment described herein and shown in the drawing. Thus, in particular, the disclosure is not limited exclusively to the use of SCR catalytic converters or NOx storage catalytic converters in the exhaust gas aftertreatment device arranged downstream of the separate exhaust branches. It is furthermore possible to employ additional catalytic converters and/or filters in this exhaust gas aftertreatment device, especially those for which temperature control in accordance with the present disclosure is particularly advantageous.

Moreover, the exhaust system according to the disclosure is not limited exclusively to the two separate exhaust branches illustrated in FIG. 2. For example, it would also be possible to arrange a third, thermally neutral exhaust branch in the exhaust system in accordance with the disclosure, allowing even more accurate and finer temperature control downstream of the separate exhaust branches by an appropriately designed flow control device.

The arrangement of the branch points (shown in FIG. 2) of the separate exhaust branches is likewise to be understood as purely illustrative. They can be arranged at any point along the exhaust line of the exhaust system. In particular, it is likewise not necessary for the disclosure that the separate exhaust branches should each branch off from the exhaust line and reenter the latter at a common branch point.

In another embodiment, the exhaust system according to the disclosure is used for an internal combustion engine, in particular for a spark-ignition or diesel engine of a motor vehicle and comprises a first exhaust gas aftertreatment device, which is arranged in the exhaust line downstream of the internal combustion engine and has an oxidation catalytic converter and/or a particulate filter, and furthermore has at least two separate exhaust branches, into which the exhaust line downstream of the first exhaust gas aftertreatment device is divided, of which one exhaust branch can be operated as a heat source and the other exhaust branch can be operated as a heat sink, and the exhaust gas stream from the internal combustion engine can be directed partially to completely through one exhaust branch and/or through the other exhaust branch by a flow control device, and a second exhaust gas aftertreatment device, which is arranged in the exhaust line downstream of the separate exhaust branches and has at least one SCR catalytic converter and/or one NOx storage catalytic converter.

The term "heat sink" in the sense used in the present disclosure is intended to denote a thermodynamic environment or heat transfer body which has a high heat capacity and, as a result, is capable of maintaining a virtually steady-state temperature condition while absorbing a large amount of heat. In contrast, a heat source in the sense used in this description can release heat continuously in a virtually steady-state temperature condition.

Dividing the exhaust line into at least two separate exhaust lines, where at least one exhaust branch can be operated as a heat source and at least one other exhaust branch can be operated as a heat sink, makes it possible to exert a specifically intended effect on the exhaust gas temperature of the exhaust gases flowing through the respective exhaust branches. In particular, the flow control device provided according to the disclosure makes it possible to precisely meter the exhaust gas flow rate through the respective exhaust branches and thus control the exhaust gas temperature downstream of the separate exhaust branches, that is to say after the exhaust branches reenter the exhaust line. This ensures optimum operation of a downstream exhaust gas aftertreatment device, which has an SCR catalytic converter and/or an NOx storage catalytic converter in particular, since, even in non-steady-state operation of the internal combustion engine, that is to say, for example, in the case of an abrupt change in the exhaust gas temperature owing to a jump in the load on the internal combustion engine, the exhaust gas temperature at the inlet of the exhaust gas aftertreatment device can be held virtually constant or at least the change in temperature at the inlet of the exhaust gas aftertreatment device occurs with a significant delay, with a significantly smaller magnitude and furthermore over a significantly longer period of time. In all cases, the exhaust system according to the disclosure prevents an abrupt change in temperature at the inlet of the exhaust gas aftertreatment device.

As already described, an abrupt rise in the exhaust gas temperature leads in an SCR catalytic converter or a NOx storage catalytic converter to an uncontrolled thermal desorption of ammonia stored in the SCR catalytic converter (ammonia slip) and of nitrogen oxides adsorbed in the NOx storage catalytic converter (nitrogen oxide slip). This ammonia or nitrogen oxide slip is effectively prevented with the exhaust system according to the disclosure since both the rate of propagation of the change in temperature within the exhaust system and the magnitude of the change in temperature are significantly attenuated or reduced by the exhaust branches that can be operated as a heat source and a heat sink, respectively.

If the exhaust gas temperature of the internal combustion engine now rises abruptly, owing to a sudden demand for power from the internal combustion engine for example, e.g. due to a sudden acceleration process by a user (kickdown), the flow control device is in this case used to direct the exhaust gas at least partially and preferably completely through the exhaust branch that can be operated as a heat sink. To achieve this, the flow control device is preferably designed to partially to completely close the exhaust branch that can be operated as a heat source and/or the exhaust branch that can be operated as a heat sink.

The exhaust gas passed through the exhaust branch that can be operated as a heat sink is cooled in accordance with the function of a heat sink, thus enabling the exhaust gas temperature at the inlet of the exhaust gas aftertreatment device arranged downstream of the exhaust branch to be controlled in a specifically intended manner. Uncontrolled desorption of the ammonia stored in the SCR catalytic converter or of the nitrogen oxides stored in the NOx storage catalytic converter owing to an abrupt rise in temperature is avoided. The ammonia stored in the SCR catalytic converter is consumed in a controlled manner as part of the normal conversion of the nitrogen oxide emissions. The nitrogen oxides stored in the NOx storage catalytic converter are likewise not released in an uncontrolled manner, in particular outside a regeneration phase. The exhaust system according to the disclosure thus permits optimum operation of the SCR catalytic converter and/or of the NOx storage catalytic converter, irrespective of the instantaneous operating condition of the internal combustion engine.

If the demand for power from the internal combustion engine is reversed and, as a consequence, the exhaust gas temperature of the internal combustion engine decreases, the flow control device is used to direct the exhaust gas at least partially, and preferably completely, through the exhaust branch that can be operated as a heat source. The temperature level of the exhaust gases flowing through this exhaust branch is thereby held constant or raised, thus ensuring an optimum temperature window at all times for the operation of an SCR catalytic converter or NOx storage catalytic converter arranged downstream of the exhaust branch, likewise irrespective of the instantaneous demand for power from the internal combustion engine.

To achieve as accurate and finely graduated as possible control of the exhaust gas temperature within the exhaust system, especially downstream of the separate exhaust branches, the exhaust gas flow rate through the respective exhaust branches can advantageously be controlled by the flow control device in accordance with at least the exhaust gas temperature of the internal combustion engine and/or with the exhaust gas mass flow and/or with the ratio of the ammonia stored in the SCR catalytic converter to the ammonia storage capacity of the SCR catalytic converter and/or with the ratio of the nitrogen oxides stored in the NOx storage catalytic converter to the nitrogen oxide storage capacity of the NOx storage catalytic converter. As a result, the flow control device can be controlled in an optimum manner in accordance with the current operating condition of the exhaust system according to the disclosure. In particular, it is possible in this way to determine the optimum position of the flow control device, which partially to completely closes or opens the exhaust branch that can be operated as a heat source and/or the exhaust branch that can be operated as a heat sink and thus allows accurate and finely graduated control of the exhaust gas temperature downstream of the separate exhaust branches.

In an embodiment of the exhaust system according to the disclosure, a heat exchanger is provided between the exhaust branch that can be operated as a heat source and the exhaust branch that can be operated as a heat sink. This allows heat transfer between the respective exhaust branches, thus enabling the heat absorbed by the exhaust branch that can be operated as a heat sink to be made available to the exhaust branch that can be operated as a heat source. It is thus possible to dispense with an additional heat-generating source for the exhaust branch that can be operated as a heat source, and, according to the disclosure, this allows an exhaust system that can be operated in a particularly energy-efficient manner.

The heat exchanger can furthermore also be designed in such a way that it draws the thermal energy that can be released to the exhaust branch that can be operated as a heat source not only from the exhaust branch that can be operated as a heat sink but also from other additional heat sources available during the operation of the internal combustion engine.

In another advantageous embodiment of the exhaust system according to the disclosure, the exhaust branch that can be operated as a heat sink has exhaust gas dynamics for delayed heat transfer. In particular, it is possible, by appropriate configuration of the size or volume of a separate exhaust branch, to achieve the desired exhaust gas dynamics in respect of the pressure and suction waves in said exhaust branch in such a way that the exhaust gases introduced into the exhaust branch flow through the exhaust branch with a certain time delay, in other words that the space velocity of the exhaust gases is significantly and advantageously reduced by the exhaust branch designed in this way. For this purpose, in a particularly simple embodiment, the exhaust branch that can be operated as a heat sink has a significantly larger volume than the exhaust branch that can be operated as a heat source, for example.

A jump in the exhaust gas temperature at the inlet to an exhaust branch designed in this way is thus passed through said branch in a delayed manner. The longer dwell time or lower space velocity of the exhaust gases can be used to release more heat to the environment or to a heat exchanger, for example. Furthermore, the lower space velocity of the exhaust gases brought about by the exhaust branch consequently also leads to a longer dwell time of the exhaust gases in a downstream exhaust gas aftertreatment device, in particular an SCR catalytic converter or NOx storage catalytic converter, thereby making it possible to achieve more effective conversion and improved cleaning performance overall.

In another embodiment of the exhaust system according to the disclosure, the exhaust branch that can be operated as a heat source is essentially an exhaust branch formed by a conventional exhaust pipe but one of significantly shorter design than the exhaust branch that can be operated as a heat sink. In this case, it is particularly simple if the exhaust branch that can be operated as a heat sink is also an exhaust branch formed by a conventional exhaust pipe, although this exhaust branch has a significantly greater length than the exhaust branch that can be operated as a heat source.

The exhaust branch that can be operated as a heat source can furthermore have thermal insulation in order to store the heat in the exhaust branch. In contrast, the exhaust branch that can be operated as a heat sink can have cooling ribs, for example, in order to allow as rapid as possible heat transfer to the environment. The exhaust branch that can be operated as a heat sink can furthermore be produced from a material which allows particularly good heat transfer, to the environment or to a heat exchanger for example, through high thermal conductivity for example. In this way, the exhaust branch that can be operated as a heat sink is capable of attenuating a jump in the exhaust gas temperature at the inlet of the exhaust branch to a considerable degree for a downstream exhaust gas aftertreatment device, in particular for an SCR catalytic converter and/or a NOx storage catalytic converter. In respect of the heat wave propagating in the exhaust system owing to the jump in temperature, the exhaust branch that can be operated as a heat sink thus represents a low pass filter.

In general terms, passing the exhaust gases through the exhaust branch that can be operated as a heat sink leads to a reduction in the exhaust gas temperature downstream of the exhaust branch since heat is removed from the exhaust gas in the exhaust branch as described above. The exhaust system according to the disclosure thus likewise allows an increase in the storage capacity of a NOx storage catalytic converter arranged downstream of the exhaust branch. This depends on the operating temperature of the NOx storage catalytic converter and decreases continuously with increasing temperature above a certain value. A large storage capacity of the NOx storage catalytic converter is advantageous particularly because, for example, in the case of a jump in the load on the internal combustion engine due to a sudden demand for power, not only the exhaust gas temperature but also the untreated NOx emissions of the internal combustion engine increase abruptly, and these can then be adsorbed, that is to say stored, by the NOx storage catalytic converter. Given a larger storage capacity of the NOx storage catalytic converter, it is furthermore possible to increase the time interval between the regeneration phases of the NOx storage catalytic converter. Regeneration can thus be initiated only after the reversal of the demand for power, for example, by substoichiometric operation of the internal combustion engine in conditions of oxygen deficiency or by additional injection of reducing agent, e.g. fuel, into the exhaust tract in order to convert the adsorbed nitrogen oxides and prepare the NOx storage catalytic converter for a new storage cycle.

In another embodiment of the exhaust system according to the disclosure, an additional exhaust gas aftertreatment device is arranged in the exhaust line upstream of the at least two separate exhaust branches. This exhaust gas aftertreatment device can have at least one oxidation catalytic converter, particulate filter, SCR catalytic converter and/or NOx storage catalytic converter, and various combinations thereof, for example. Thus it is likewise possible, for example, to arrange catalytic converters or filters which on the one hand can be operated optimally in a relatively high temperature range and on the other hand are relatively insensitive to temperature fluctuations closer to the outlet of the internal combustion engine and to combine them in a common exhaust system with catalytic converters or filters which achieve optimum cleaning or conversion performance in a relatively low temperature window and for the efficient operation of which abrupt changes in temperature, in particular, are avoided by the disclosure described herein.

By the exhaust system according to the disclosure, it is likewise possible to mitigate or avoid the effect of abrupt changes in temperature, due, for example, to high-temperature regeneration of a particulate filter or a NOx storage catalytic converter, on the catalytic converters and/or filters arranged downstream in the exhaust line. This creates a greater degree of freedom for the arrangement or the order of catalytic converters and/or filters within an exhaust system.

Turning to FIG. 3, a method 300 for controlling temperature of exhaust entering an exhaust aftertreatment device is shown. Method 300 may be carried out by a control system of an engine, such as control system 14. Method 300 comprises, at 302, determining engine operating parameters. Determining the engine operating parameters may include determining engine and/or exhaust temperature, engine load, storage capacity of one or more exhaust aftertreatment devices, mass flow of exhaust through the exhaust system, etc. The operating parameters may be sensed by one or more sensors in the engine, such as temperature sensor 126. Method 300 comprises, at 304, determining if exhaust temperature is above a first threshold. The first threshold may be any suitable temperature over which performance of an exhaust gas aftertreatment device is compromised, for example, a temperature at which stored ammonia or NOx may be released.

If it is determined that the exhaust temperature is above the first threshold, method 300 proceeds to 306 to control a flow control device located upstream of the exhaust aftertreatment device to increase exhaust flow through a first branch of the exhaust line that dissipates heat a greater rate than a second branch, such as including a heat sink. As explained above with respect to FIG. 2, when the temperature of the exhaust is high, the heat may be removed by a heat sink in the exhaust line such that overly-hot exhaust does not reach the aftertreatment device. The heat sink may include a portion of a heat exchanger configured to remove heat and transfer it a different portion of the heat exchanger. In another embodiment, the heat sink may include a portion of the exhaust line that contains rib-like structures configured to dissipate heat. Additionally, the heat sink may include a portion of the exhaust line that is enlarged in order to facilitate heat transfer to the environment.

If it is determined that the engine temperature is not above the first threshold, method 300 proceeds to 308 to determine if the exhaust temperature is below a second threshold. The second threshold may include any suitable temperature below which the aftertreatment device loses effectiveness, such as the light-off temperature of the device. If it is determined that the exhaust temperature is below the second threshold, method 300 proceeds to 310 to control the flow control device to increase the exhaust flow through the second branch of the exhaust line that is configured to retain heat at a greater rate than the first branch, such as including a heat source. As explained above with respect to FIG. 2, when the temperature of the exhaust is low, heat may be retained and/or added by a heat source in the exhaust line such that overly-cool exhaust does not reach the aftertreatment device. The heat source may include the portion of the heat exchanger configured to receive heat removed from the hot exhaust, as explained above. In another embodiment, the heat source may include a portion of the exhaust line that contains thermal insulation to retain heat. Additionally, the heat source may include a portion of the exhaust line that is shrunk in order to facilitate heat retention within the exhaust line.

If it is determined at 310 that the exhaust temperature is not below the second threshold, method 300 proceeds to 312 to maintain current operating parameters. Current operating parameters may include controlling the flow control device such that an equal amount of exhaust flows in both branches of the exhaust line, or controlling the flow control device in any suitable manner in which to continue to provide the exhaust to the aftertreatment device at the desired temperature.

Additionally, both 306 and 310 proceed to 314 to adjust an amount of reductant injected into the aftertreatment device based on a ratio of exhaust flowing through the first and second branches. For example, when the exhaust temperature is above the first threshold, it may indicate a rich air-fuel ratio excursion. As such, the NOx contained in the exhaust may be lower than during lean excursions, when exhaust temperature is below the threshold, and an amount of reductant may be decreased. Likewise, when exhaust temperature is low, it may indicate a lean excursion, in which NOx production may be increased, and reductant injection amount may be increased. The amount of reductant supplied to the aftertreatment device may additionally be determined by other operating parameters not discussed herein, such as engine load.

Thus, method 300 provides for supplying exhaust gas to an aftertreatment device at a desired temperature, even when the temperature of the exhaust gas upon exiting the engine is above or below the desired temperature. In this way, performance of the aftertreatment device may be maintained at an optimal level. While the respective flow through the branches of the exhaust line is controlled based on exhaust temperature in the depicted embodiment, other operating parameters may be used, such as engine load and/or exhaust gas mass flow, or the NOx and/or ammonia storage capacity of the aftertreatment device. Also, while in the depicted embodiment the heat dissipation and retention in the branches are passive side effects of the exhaust flow as based on exhaust temperature, they may be monitored by the controller and the exhaust flow through the first and second branches may be controlled in order to maintain each branch at a predetermined temperature, or to maintain heat transfer between the two branches at a predetermined rate.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system for an internal combustion engine, comprising:
   an exhaust line;
   at least one exhaust gas aftertreatment device arranged in the exhaust line; and
   a heat source and a heat sink arranged in separate branches of the exhaust line upstream of the exhaust gas aftertreatment device and coupled to each other forming a heat-exchanger, wherein the heat-exchanger transfers heat from the heat source to the heat sink, wherein the separate exhaust branches merge downstream of the heat exchanger and upstream of the after treatment device, and an exhaust gas flow rate through each respective separate exhaust branch controlled by at least one flow control device.

2. The exhaust system as claimed in claim 1, wherein the at least one exhaust gas aftertreatment device includes an SCR catalytic converter and wherein the exhaust gas flow rate through the respective exhaust branches is controlled by the flow control device in accordance with an exhaust gas temperature of the internal combustion engine, with an exhaust gas mass flow, or with a ratio of ammonia stored in the SCR catalytic converter to an ammonia storage capacity of the SCR catalytic converter.

3. The exhaust system as claimed in claim 1, wherein the at least one exhaust gas aftertreatment device includes a NOx storage catalytic converter and wherein the exhaust gas flow rate through the respective exhaust branches is controlled by the flow control device in accordance with an exhaust gas temperature of the internal combustion engine, with an exhaust gas mass flow, or with a ratio of nitrogen oxides stored in the NOx storage catalytic converter to a nitrogen oxide storage capacity of the NOx storage catalytic converter.

4. The exhaust system as claimed in claim 1, wherein the separate branches of the exhaust line are openable and closeable partially to completely by the flow control device.

5. The exhaust system as claimed in claim 1, wherein the exhaust branch that includes the heat source is shorter than the exhaust branch that includes the heat sink and wherein the exhaust branch that includes the heat sink has a larger volume than the exhaust branch that includes the heat source.

6. The exhaust system as claimed in claim 1, wherein the heat source comprises thermal insulation in the exhaust line.

7. The exhaust system as claimed in claim 1, wherein the heat sink comprises cooling ribs.

8. The exhaust system as claimed in claim 1, further comprising an additional exhaust gas aftertreatment device including at least one oxidation catalytic converter, one particulate filter, one NOx storage catalytic converter, or one SCR catalytic converter arranged in the exhaust line upstream of the separate exhaust branches.

9. A method for controlling engine exhaust gas temperature, comprising:
    operating an engine having a first and second branch in an exhaust line upstream of an exhaust aftertreatment device, the first branch configured to dissipate heat at a greater rate than the second branch, the second branch configured to retain heat at a greater rate than the first branch;
    in response to the exhaust gas temperature being above a first threshold, controlling a flow control device located at a branch point in the exhaust line to increase exhaust flow through the first branch compared to the second branch before entering the exhaust aftertreatment device; and
    in response to the exhaust gas temperature being below a second threshold, controlling the flow control device to increase exhaust flow through the second branch compared to the first branch before entering the exhaust gas aftertreatment device;
    and wherein the exhaust gas aftertreatment device is an SCR catalytic converter, and further comprising controlling the flow control device based on a ratio of ammonia stored in the SCR catalytic converter to an ammonia storage capacity of the SCR catalytic converter.

10. The method of claim 9, further comprising controlling the flow control device based on one or more of engine load and an exhaust gas mass flow.

11. The method of claim 9, wherein the exhaust gas aftertreatment device is a NOx storage catalytic converter, and further comprising controlling the flow control device based on a ratio of nitrogen oxides stored in the NOx storage catalytic converter to a nitrogen oxide storage capacity of the NOx storage catalytic converter.

12. The method of claim 9, wherein controlling the flow control device to increase exhaust flow through the first branch further comprises controlling the flow control device to increase exhaust flow through a first portion of a heat exchanger located upstream of the exhaust gas aftertreatment device, the heat exchanger configured to transfer heat from the first portion to a second portion of the heat exchanger.

13. The method of claim 12, wherein controlling the flow control device to increase the exhaust flow through the second branch further comprises controlling the flow control device to increase exhaust flow through the second portion of the heat exchanger.

14. A system for controlling engine exhaust temperature, comprising:
    an exhaust line coupling a first exhaust device to a second exhaust device, the exhaust line including a first and a second branch and a flow control device to control exhaust flow through the first and second branches, wherein the first and second branches merge upstream of the second exhaust device; and
    a reductant injector to inject reductant into at least one of the exhaust devices;
    a heat exchanger for transferring heat between branches; and
    a control system including a controller holding instructions executable to:
        operate the flow control device to direct exhaust through the first branch of the exhaust line when exhaust temperature is above a threshold, the first branch configured to dissipate heat at a greater rate than the second branch; and
        operate the flow control device to direct exhaust through the second branch of the exhaust line when exhaust temperature is below a second threshold, the second branch configured to retain heat at a greater rate than the first branch.

15. The system of claim 14, wherein an amount of reductant injected by the reductant injector is determined based on a ratio of exhaust flow through the first and second branches.

16. The system of claim 15, wherein exhaust flowing through the first branch has a greater spatial velocity than exhaust flowing through the second branch.

17. The system of claim 15, further comprising a heat exchanger arranged in both the first and second branches, the heat exchanger configured to transfer heat from the first branch to the second branch.

* * * * *